US008464286B2

(12) United States Patent
Choi et al.

(10) Patent No.: US 8,464,286 B2
(45) Date of Patent: Jun. 11, 2013

(54) MOBILE TERMINAL AND CONTROLLING METHOD THEREOF

(75) Inventors: Kwanghun Choi, Suwon-si (KR); Kiwon Jeon, Seoul (KR); Kihoa Nam, Uiwang-si (KR)

(73) Assignee: LG Electronics Inc., Seoul (KR)

( * ) Notice: Subject to any disclaimer, the term of this patent is extended or adjusted under 35 U.S.C. 154(b) by 130 days.

(21) Appl. No.: 13/087,633

(22) Filed: Apr. 15, 2011

(65) Prior Publication Data
US 2012/0030700 A1     Feb. 2, 2012

(30) Foreign Application Priority Data

Aug. 2, 2010   (KR) ................... 10-2010-0074561

(51) Int. Cl.
| | |
|---|---|
| G06F 3/00 | (2006.01) |
| G06F 13/00 | (2006.01) |
| H04N 7/16 | (2011.01) |
| H04N 5/445 | (2011.01) |

(52) U.S. Cl.
USPC .............. 725/27; 725/25; 725/37; 725/38; 725/39; 725/56; 715/700; 715/716; 715/719

(58) Field of Classification Search
USPC ........................................... 725/31
See application file for complete search history.

(56) References Cited

U.S. PATENT DOCUMENTS

| | | | | |
|---|---|---|---|---|
| 6,157,809 | A  * | 12/2000 | Kambayashi | ............... 725/91 |
| 7,174,512 | B2 * | 2/2007 | Martin et al. | .............. 715/719 |
| 2004/0123313 | A1 * | 6/2004 | Koo et al. | .................... 725/31 |
| 2005/0021985 | A1 | 1/2005 | Ono et al. | |
| 2010/0107258 | A1 | 4/2010 | Park et al. | |

FOREIGN PATENT DOCUMENTS

| | | |
|---|---|---|
| EP | 1 772 986 A2 | 4/2007 |
| EP | 2 026 238 A1 | 2/2009 |

* cited by examiner

*Primary Examiner* — Justin Shepard
(74) *Attorney, Agent, or Firm* — Birch, Stewart, Kolasch & Birch, LLP

(57) ABSTRACT

A mobile terminal and controlling method thereof are disclosed, which facilitates a terminal to be used in further consideration of user's convenience. The present invention includes displaying a channel list in which receivable channels including at least one pay broadcast channel are listed, receiving a broadcast viewing authority for watching the pay broadcast channel from a broadcast viewing authority server via a broadcasting network or an internet network, storing the received broadcast viewing authority, and updating the stored broadcast viewing authority each time a broadcast mode is entered. Accordingly, when the broadcast viewing authority is updated in the mobile terminal to prevent illegal copying or piracy of the broadcast viewing authority, the terminal user needs not to temporarily stop viewing the corresponding broadcast. Moreover, each time the mobile terminal enters a broadcast mode, an old broadcast viewing authority is deactivated and a new broadcast viewing authority is received. Therefore, the illegal copying or piracy of the broadcast viewing authority stored in the mobile terminal can be basically prevented.

14 Claims, 9 Drawing Sheets

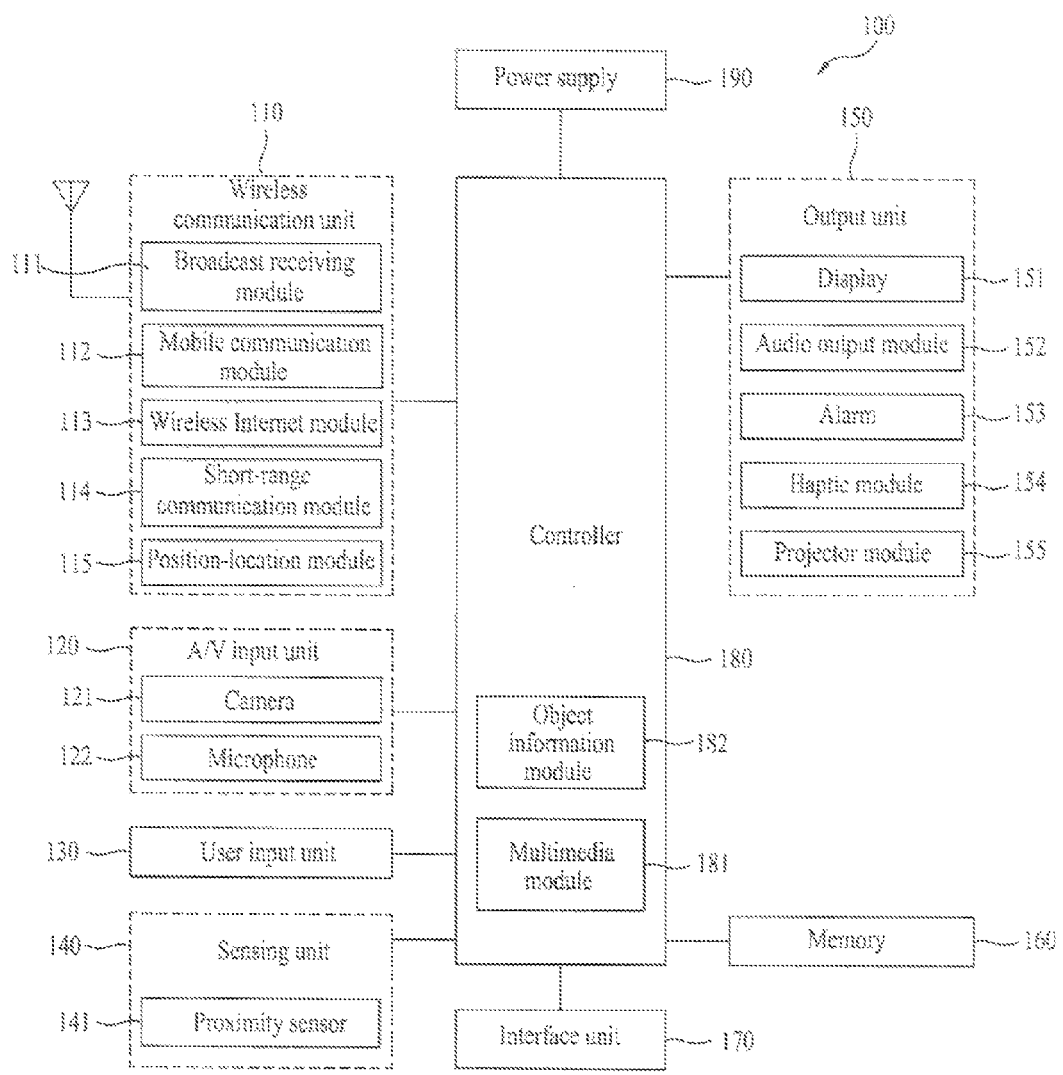

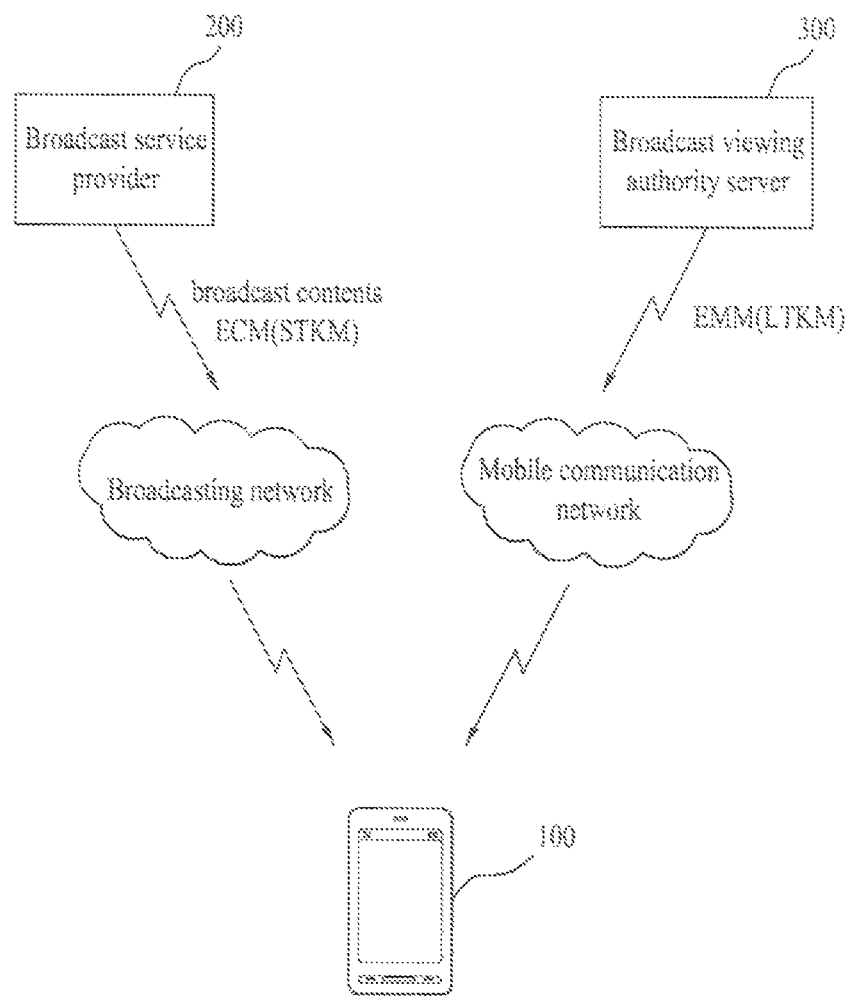

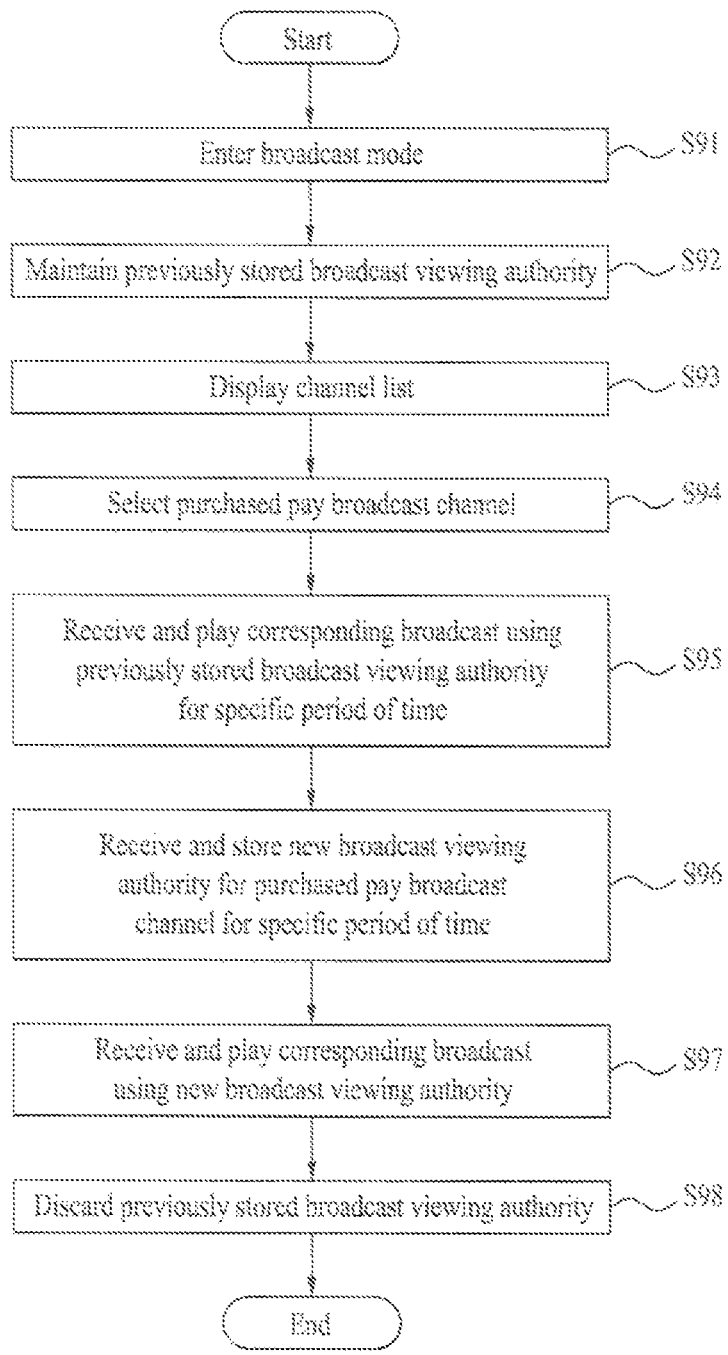

MOBILE TERMINAL AND CONTROLLING METHOD THEREOF

Pursuant to 35 U.S.C. §119(a), this application claims the benefit of earlier filing date and right of priority to Korean Application No. 10-2010-0074561, filed on Aug. 2, 2010, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for facilitating a terminal to be used in further consideration of user's convenience.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Recently, various kinds of mobile terminals capable of broadcast reception have been introduced. And, a specific broadcast channel received by one of the mobile terminals may be subscription-based (pay-per-view). In this case, a terminal user performs a purchase procedure for the specific broadcast channel, downloads a broadcast viewing authority of the specific broadcast channel to the corresponding mobile terminal, and is then able to watch the specific broadcast channel.

Since a broadcast service provider frequently changes the broadcast viewing authority to prevent an unauthorized third party from performing illegal copying, piracy and the like in advance, the broadcast viewing authority downloaded to the mobile terminal of the terminal user having completed the purchase procedure needs to be frequently updated as well.

However, when the terminal user is watching a prescribed broadcast on the mobile terminal, if a broadcast play is temporarily interrupted due to the update of the broadcast viewing authority, it may cause a considerable inconvenience to the terminal user. Therefore, ongoing efforts need to be made to research and develop a method of updating the broadcast viewing authority without the interruption of the terminal user's broadcast watching by efficiently preventing the illegal copying or piracy of the broadcast viewing authority.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which the interruption of the terminal user's broadcast watching can be avoided despite preventing the illegal copying or piracy of the broadcast viewing authority downloaded to the mobile terminal efficiently.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a broadcast receiving unit for a broadcast reception, a wireless communication unit for an internet access, a broadcast security module configured to store a broadcast viewing authority, a display unit configured to play a broadcast, and a controller configured to display a channel list in which channels including at least one pay broadcast channel receivable via the broadcast receiving unit are listed, receive the broadcast viewing authority from a broadcast viewing authority server via the broadcast receiving unit or the wireless communication unit, and control the broadcast viewing authority for viewing the pay broadcast channel stored in the broadcast security module to be updated each time a broadcast mode is entered.

In another aspect of the present invention, a method of controlling a mobile terminal according to the present invention includes displaying a channel list in which receivable channels including at least one pay broadcast channel are listed, receiving a broadcast viewing authority for watching the pay broadcast channel from a broadcast viewing authority server via a broadcasting network or an internet network, storing the received broadcast viewing authority, and updating the stored broadcast viewing authority each time a broadcast mode is entered.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 1 is a block diagram of a mobile terminal according to one embodiment of the present invention;

FIG. 3 is a schematic diagram of a wireless environment for implementing a mobile terminal and controlling method thereof according to embodiments of the present invention;

FIG. 9 is a flowchart for a method of controlling a mobile terminal according to an embodiment of the present invention.

DETAILED DESCRIPTION OF THE INVENTION

Figure 2A:
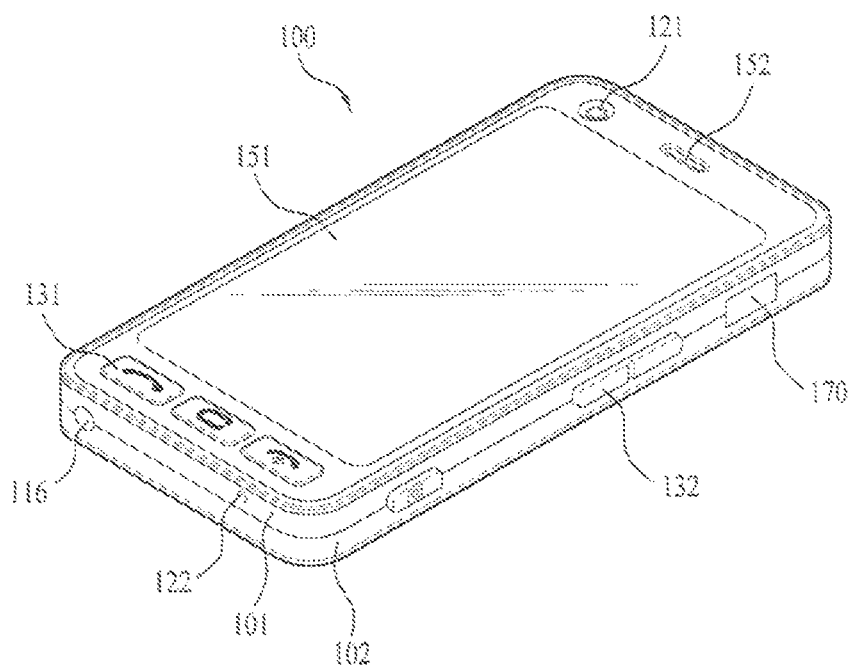
FIG. 2A is a front perspective diagram of a mobile terminal according to one embodiment of the present invention.

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile terminals, such as mobile phones, user equipment, smart phones, mobile computers, digital broadcast terminals, personal digital assistants, portable multimedia players (PMP) and navigators.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. In this disclosure, the broadcast associated information can be called a broadcast service guide as well. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS(Convergence of Broadcasting and Mobile Service), OMA-BCAST, CMMB (China Multimedia Mobile Broadcasting), MBBMS (Mobile Broadcasting Business Management System), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM(Global System for Mobile communications), CDMA(Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN(Wireless LAN) (Wi-Fi), Wibro (Wireless broadband), Wimax (World Interoperability for Microwave Access), HSDPA(High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen may be named 'proximity touch'. And, an action that a pointer actually touches the touchscreen may be named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 2B:
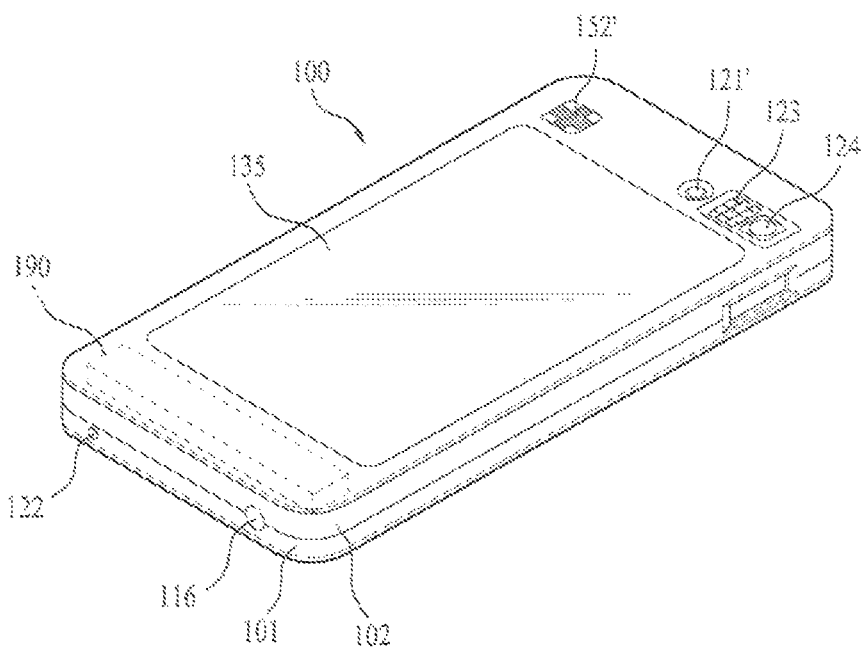
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 2A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this case, if the display 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

In the following description, embodiments related to a controlling method, which can be implemented in the mobile terminal 100, are explained with reference to the accompanying drawings. And, it is understood that the following embodiments can be implemented individually or in a manner of being combined with one another.

In the following embodiment, the display module 151 can include a touchscreen. Yet, even if the display unit 151 does not include a touchscreen, it is understood that the following embodiments can be sufficiently implemented by a manipulation of the user input unit 140. And, a display screen of the touchscreen 151 shall be indicated by a reference number 400 in the following description.

A wireless environment for implementing a mobile terminal and controlling method thereof according to embodiments of the present invention is schematically described with reference to FIG. 3 as follows.

FIG. 3 is a schematic diagram of a wireless environment for implementing a mobile terminal and controlling method thereof according to embodiments of the present invention.

Referring to FIG. 3, a broadcast service provider 200 transmits a broadcast transport stream (TS) on a specific broadcasting frequency via a broadcasting network.

In this case, the broadcast transport stream includes broadcast contents of several broadcast channels. For instance, the broadcast content on a pay broadcast channel among the several broadcast channels carried on the broadcast transport stream can be transmitted in a manner of being scrambled with a secret key to enable a user having purchased a broadcast viewing authority to watch the corresponding broadcast content only. In particular, the secret key can be called a control word. And, the control word is frequently changed in the course of the broadcast transmission to prevent piracy by an unauthorized third party. For instance, the control word can be changed every 10 seconds.

In order for the mobile terminal 100 to unscramble the scrambled broadcast content of the pay broadcast channel, the mobile terminal 100 should be aware of a current value of the control word in advance. In particular, the control word is provided via the broadcast transport stream to the mobile terminal 100 from the broadcast service provider in a manner of being encrypted by the broadcast service provider to prevent piracy. And, the control word can be encrypted into an entitled control message (ECM). As mentioned in the foregoing description, since the ECM is frequently changed in the course of the broadcast transmission, the ECM can be called a short-term key message (STKM).

Meanwhile, when the broadcast transport stream is transmitted, the broadcast service provider 200 is able to transmit the broadcast transport stream in a manner of multiplexing a broadcast service guide provided by a broadcast service guide server (not shown in the drawing) with the broadcast transport stream [not shown in FIG. 3]. In this case, the broadcast service guide server is configured by being included in the broadcast service provider 200 or can exist separately from the broadcast service provider 200.

A broadcast viewing authority server 300 provides the broadcast viewing authority to the mobile terminal of a user having the broadcast viewing authority via the mobile communication network. In this case, the broadcast viewing authority can be provided as EMM (entitlement management message) to the mobile terminal. For example, FIG. 3 exemplarily shows that the broadcast viewing authority is provided to the mobile terminal via the mobile communication network, by which the present invention is non-limited. Alternatively, the broadcast viewing authority can be provided to the mobile terminal via a data channel of the broadcasting network. Besides, since the EMM is changed by a cycle much longer than that of the ECM, it can be called a long-term key message (LTKM).

In the following description, assume that the broadcast viewing authority is stored in the memory 160. This assumption is made for clarity of the following description of the present invention, by which the present invention is non-limited. For instance, the broadcast viewing authority can be stored in such an identity module as the SIM. Alternatively, the broadcast viewing authority can be stored in the broadcast receiving module. Alternatively, a separate broadcast security module (not shown in the drawing) is provided to manage the broadcast viewing authority in the mobile terminal 100 and the broadcast viewing authority can be stored in the broadcast security module. Moreover, the memory or identity module configured to store the broadcast viewing authority can be understood as a sort of the broadcast security module.

Meanwhile, the broadcast service guide server (not shown in the drawing) can provide the broadcast service guide to the mobile terminal 100 via the mobile communication network [not shown in FIG. 3].

In the following description, a process for playing back the transmitted broadcast content in the mobile terminal using the received broadcast viewing authority is explained with reference to FIG. 4.

Figure 4:
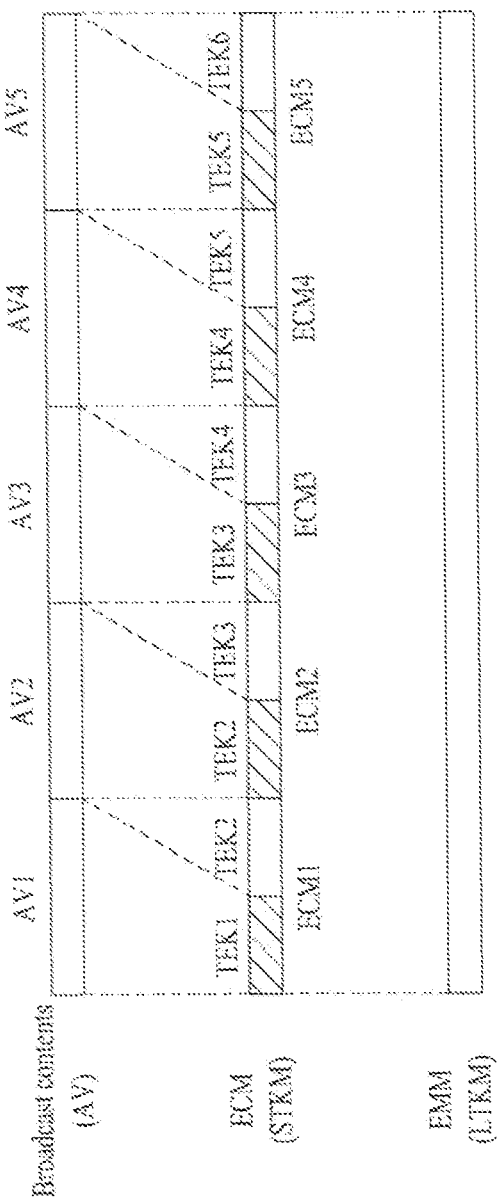
FIG. 4 is a graph of relations among broadcast contents, ECM and EMM for implementing a mobile terminal and controlling method thereof according to embodiments of the present invention.

FIG. 4 is a graph of relations among broadcast contents, ECM and EMM for implementing a mobile terminal and controlling method thereof according to embodiments of the present invention.

Referring to FIG. 4, the mobile terminal 100 generates a traffic encryption key (TEK) by decrypting the ECM using the received EMM.

In particular, the broadcast content can be divided into a plurality of broadcast contents (e.g., a first broadcast content AV1, a second broadcast content AV2, a third broadcast content AV3 . . . ) by a predetermined time interval (e.g., 10 seconds).

While the mobile terminal plays back the first broadcast content AV1 using a first TEK TEK1, the mobile terminal generates a second TEK TEK2 for the second broadcast content AV2 using the EMM.

Subsequently, while the mobile terminal plays back the second broadcast content AV2 using the generated second TEK TEK2, the mobile terminal generates a third TEK TEK3 for the third broadcast content AV3 using the EMM.

That is, while the mobile terminal plays back the $N^{th}$ broadcast content using the generated $N^{th}$ TEK $TEK_N$, the mobile terminal generates an $(N+1)^{th}$ TEK $TEK_{N+1}$ for the $(N+1)^{th}$ broadcast content $AV_{N+1}$ using the EMM.

In the above-described manner, the mobile terminal generates the TEK slightly earlier than a real timing of using the TEK by decrypting the ECC using the EMM, thereby enabling the broadcast content to be seamlessly played back.

The mobile terminal counts the number of the encrypted ECC. If the counted number of the ECC is greater than a previously set value in association with the broadcast viewing authority, the mobile terminal can be configured to recognize that the broadcast viewing authority has expired.

As mentioned in the foregoing description, the broadcast service provider is able to periodically change the broadcast viewing authority to prevent piracy of the broadcast viewing authority. Therefore, the mobile terminal needs to update the changed broadcast viewing authority.

In the following description, a process for the mobile terminal to update the broadcast viewing authority is explained in detail with reference to FIG. 5 and FIG. 6.

Figure 5:
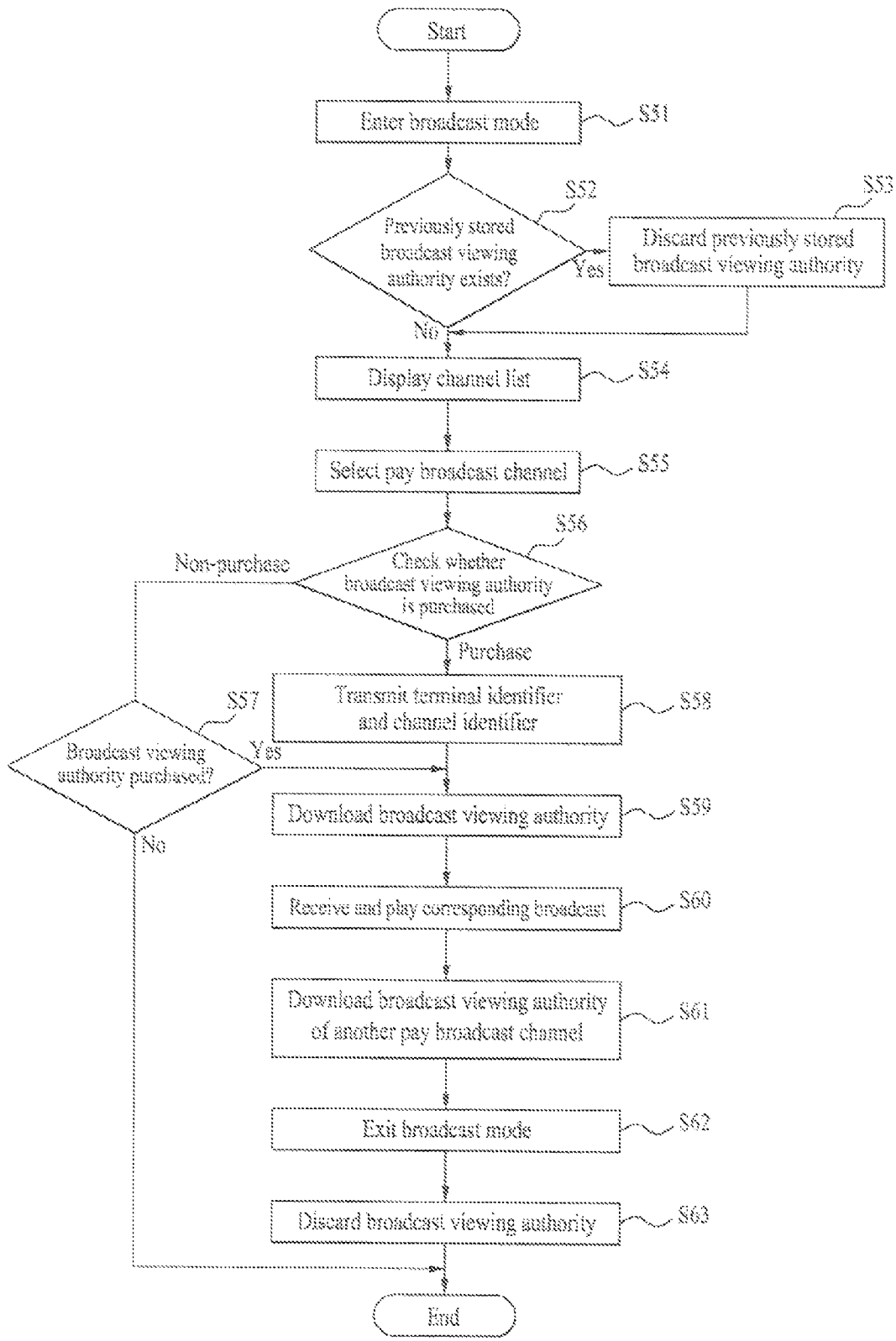
FIG. 5 is a flowchart for a method of controlling a mobile terminal according to an embodiment of the present invention.

FIG. 5 is a flowchart for a method of controlling a mobile terminal according to an embodiment of the present invention. And, FIG. 6 is a diagram of display screen configurations for implementing a method of controlling a mobile terminal according to an embodiment of the present invention.

Figure 6:
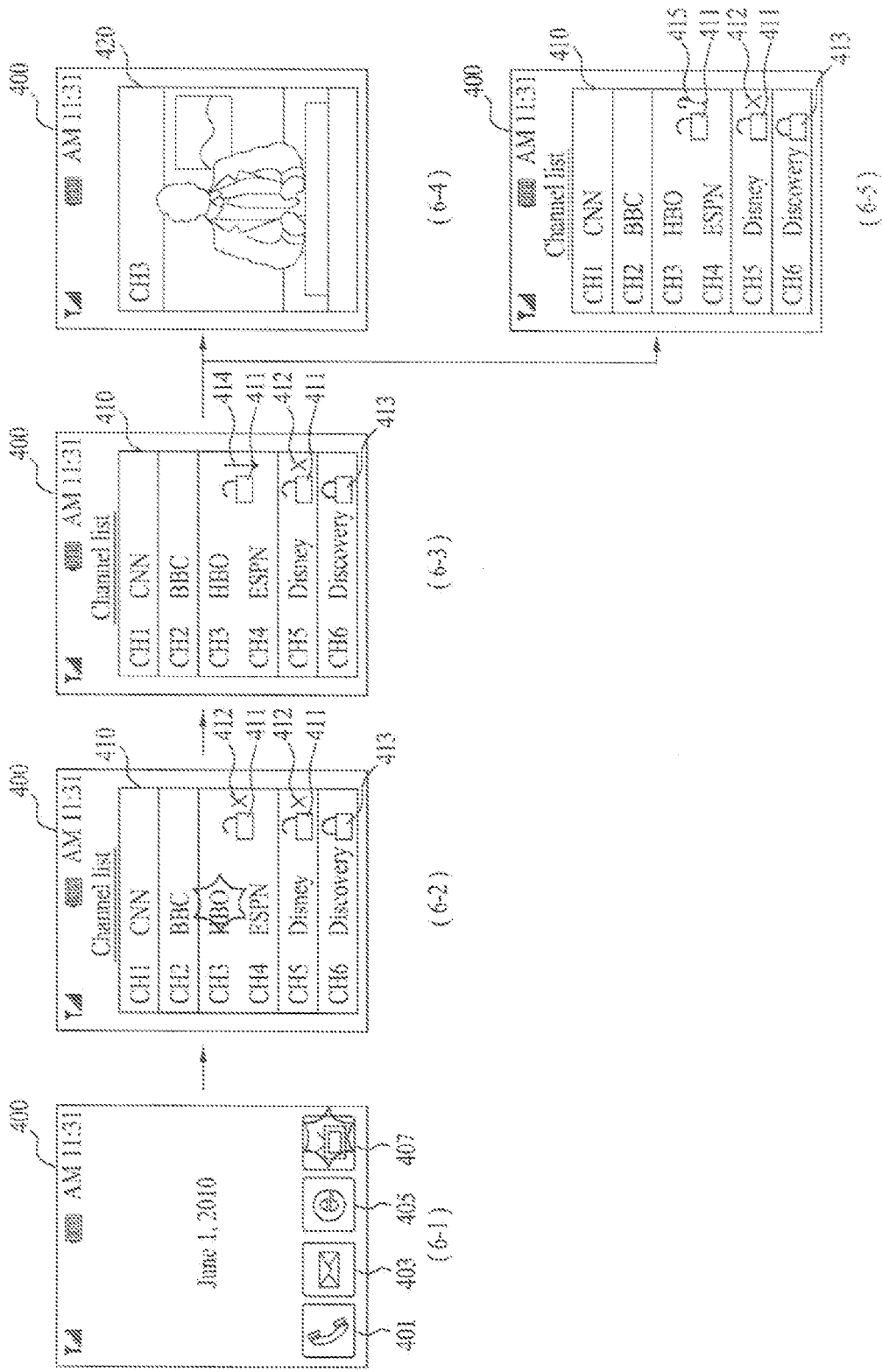
FIG. 6 is a diagram of display screen configurations for implementing a method of controlling a mobile terminal according to an embodiment of the present invention.

Referring to FIG. 6 (6-1), the mobile terminal 100 is in a standby mode and a standby screen can be displayed on the touchscreen 400.

For example, a phone icon a mesage icon, an internet icon 405 and a broadcast icon 407 can be displayed on the standby screen of the touchscreen 400. If the broadcast icon 407 is touched and selected, the mobile terminal 100 is able to enter a broadcast mode [S51]. Aside from the touch to the broadcast icon 407, it is apparent to those skilled in the art that the mobile terminal 100 can enter the broadcast mode through an appropriate key manipulation of the user input unit 130 in the mobile terminal 100.

Once the mobile terminal 100 enters the broadcast mode, various functions related to broadcast reception and playback can be performed for a terminal user.

When the broadcast mode is entered, the controller 180 checks whether there exists a broadcast viewing authority previously stored in the memory 160 [S52].

If the previously stored broadcast viewing authority exists in the memory 160, the controller 180 discards the corresponding broadcast viewing authority to make it invalid [S53]. For clarity of the following description, the broadcast viewing authority previously stored in the memory 160 can be called an "old broadcast viewing authority".

In order to discard the old broadcast viewing authority, the controller 180 deletes the old broadcast viewing authority from the memory 160. Alternatively, in order to discard the old broadcast viewing authority, the controller 180 informs the broadcast viewing authority server that the old broadcast viewing authority is no longer valid without deleting the old broadcast viewing authority. Thus, the old broadcast viewing authority may be considered as being invalid, so that a reception or playback of a corresponding pay broadcast channel is not allowed with the old broadcast viewing authority.

If a step S63 explained in the following description is mandatory in the present embodiment, the step S52 of checking whether the previously stored old broadcast viewing authority exists and the step S53 of discarding the previously stored old broadcast viewing authority can be omitted from the present embodiment.

Afterwards, referring to FIG. 6 (6-2), the controller 180 is able to display a channel list 410, on which broadcast channels viewable in the mobile terminal 100 are listed, on the touchscreen 400 [S54].

In particular, the channel list 410 can include a list including the broadcast channels viewable in the mobile terminal 100 which the controller 180 makes by referring to the broadcast service guide received from the broadcast service guide server automatically or manually.

As a result of the checking step, if the old broadcast viewing authority exists, the old broadcast viewing authority is discarded [S52, S53]. The step S52 and the step S53 can be performed simultaneously with the step S54 of displaying the channel list 410. Alternatively, after the step S54 has been performed, the steps S52 and S53 can be performed.

The channel list 410 can include pay-free broadcast channels (e.g., CNN, BBC, etc.) requiring no broadcast viewing authority for reception and playback of broadcasts and pay broadcast channels (e.g., HBO, ESPN, etc.) (pay-per-view) requiring the broadcast watch authorities.

In order to visually distinguish the pay-free broadcast channels from the pay broadcast channels in the channel list 410, a channel purchase indicator 411 or a channel non-purchase indicator 413 can be displayed on the corresponding pay broadcast channel. In this case, the channel purchase indicator 411 is provided to display the pay broadcast channel already purchased by a terminal user. And, the channel non-purchase indicator 413 is provided to display the pay broadcast channel that is not purchased by a terminal user yet.

For instance, referring to FIG. 6 (6-2), the channel purchase indicators 411 are displayed on HBO, ESPN and Disney, respectively, to indicate that the corresponding channels are the pay broadcast channels purchased by the terminal user. The channel non-purchase indicator 413 is displayed on Discovery to indicate that the corresponding broadcast channel is the pay broadcast channel that is not purchased by the terminal user yet.

Each of the pay broadcast channels can be individually sold. Alternatively, at least two of the pay broadcast channels can be sold in a bundle. All of the at least two channels sold in the bundle are viewable using a single broadcast viewing authority.

For instance, referring to FIG. 6 (6-2), a single channel purchase indicator 411 is displayed in common with the channels HBO and ESPN, which are tied up in a bundle, on the channel list 410 to indicate that the single channel purchase indicator 411 is responsible for both of the channels HBO and ESPN.

Whether the pay broadcast channel is purchased or not can be determineded in a following manner. First of all, after purchase information on pay broadcast channels has been stored in the memory 160, when the channel list is displayed, the controller 180 refers to the stored pay broadcast channel purchase information.

Alternatively, whether the pay broadcast channel is purchased or not can be determineded in a following manner. First of all, when the controller 180 displays the channel list, the controller 300 accesses the broadcast viewing authority server 300 and then checks whether the pay broadcast channel on the channel list is purchased or not.

FIG. 6 (6-2) exemplarily shows that a non-authority indicator 412 indicating that there is no valid broadcast viewing authority for the corresponding pay broadcast channel is displayed together with the channel purchase indicator 411. In this case, the display of the non-authority indicator 412 may be attributed to discarding the corresponding old broadcast viewing authority in the step S53.

Meanwhile, one of the pay broadcast channels, e.g., HBO, can be touched and selected from the channel list 410 [S55].

If so, the controller 180 checks whether a broadcast viewing authority valid for the selected pay broadcast channel has been purchased in the mobile terminal 100 [S56].

As a result of the checking step S56, if the broadcast viewing authority is not purchased, the controller 180 enables the terminal user to proceed with a purchase procedure for purchasing the broadcast viewing authority for the selected pay broadcast channel [S57].

On the contrary, as a result of the checking step S56, if the broadcast viewing authority is already purchased, the controller 180 transmits a channel identifier (e.g., channel ID, channel bundle ID, etc.) of the selected pay broadcast channel and a terminal identifier of the mobile terminal 100 to the broadcast viewing authority server 300 [S58]. For example, the terminal identifier can include one of "IMSI (International Mobile Subscriber Identity)", "IMEI (International Mobile Equipment Identity)", "MIN (Mobile Identification Number)", "MDN (Mobile Directory Number)" and the like, by which the present invention is non-limited.

Thereafter, referring to FIG. 6 (6-3), the mobile terminal is able to newly download a broadcast viewing authority valid for the selected pay broadcast channel from the broadcast viewing authority server 300 [S59]. For clarity of the following description, the newly downloaded broadcast viewing authority can be called a new broadcast viewing authority.

FIG. 6 (6-3) exemplarily shows that a download indicator 414 indicating that a new broadcast viewing authority is downloaded is displayed in association with the selected pay broadcast channel.

After completion of the download of the new broadcast viewing authority, referring to FIG. 6 (6-4), the controller 180 is able to receive and play a corresponding broadcast 420 of the selected pay broadcast channel using the downloaded new broadcast viewing authority [S60].

While the controller 180 receives and plays the corresponding broadcast of the selected pay broadcast channel, the controller 180 is also able to download a new broadcast viewing authority of another unselected pay broadcast channel (e.g., "Disney") as a background from the broadcast viewing authority server [S61]. In this case, this step S61 is optional and can be omitted from the present embodiment.

If the terminal user attempts to stop watching the broadcast, the terminal user is able to terminate the broadcast mode through an appropriate manipulation of the user input unit 130 in the mobile terminal 100 [S62].

If so, the controller 180 is able to discard the downloaded new broadcast viewing authority [S63]. If the new broadcast viewing authority remains valid in the mobile terminal 100, it may be pirated by an unauthorized third party. To prevent this, the downloaded new broadcast viewing authority is discarded.

If the aforesaid steps S52 and S53 are included in the present embodiment, the step S63 of discarding the downloaded new broadcast viewing authority can be omitted from the present embodiment.

Meanwhile, if the mobile terminal 100 fails in downloading the new broadcast viewing authority for the selected pay broadcast channel due to a poor status of communication with the broadcast viewing authority server 300 for example, referring to FIG. 6 (6-5), the controller 180 is able to display a download failure indicator 415 indicating that the download is not successful.

If the download of the new broadcast viewing authority is not successful, the controller 180 is able to control the new broadcast viewing authority to keep being tried until the download becomes successful, while the mobile terminal 100 is in the broadcast mode.

Alternatively, if the download of the new broadcast viewing authority is not successful, the controller 180 generates a popup window (not shown in the drawing) indicating that the download has not been successful. The controller 180 is then able to control the popup window to be provided with a user interface that enables the terminal user to select whether to try the download again or stop the download.

Alternatively, if the download of the new broadcast viewing authority is not successful, the controller 180 is able to control the download of the new broadcast viewing authority to be tried again when the broadcast service guide is updated automatically or manually.

Alternatively, if the download of the new broadcast viewing authority is not successful, the controller 180 is able to control the download of the new broadcast viewing authority to be tried again when the corresponding pay broadcast channel failing in the download is selected to be watched from the channel list.

According to the above description, after one of the pay broadcast channels has been selected from the channel list, the broadcast viewing authority is downloaded, by which the present embodiment is non-limited. For instance, it is able to download the broadcast viewing authority before the corresponding pay broadcast channel is selected. This is explained in detail with reference to FIG. 7 and FIG. 8 as follows.

Figure 7:
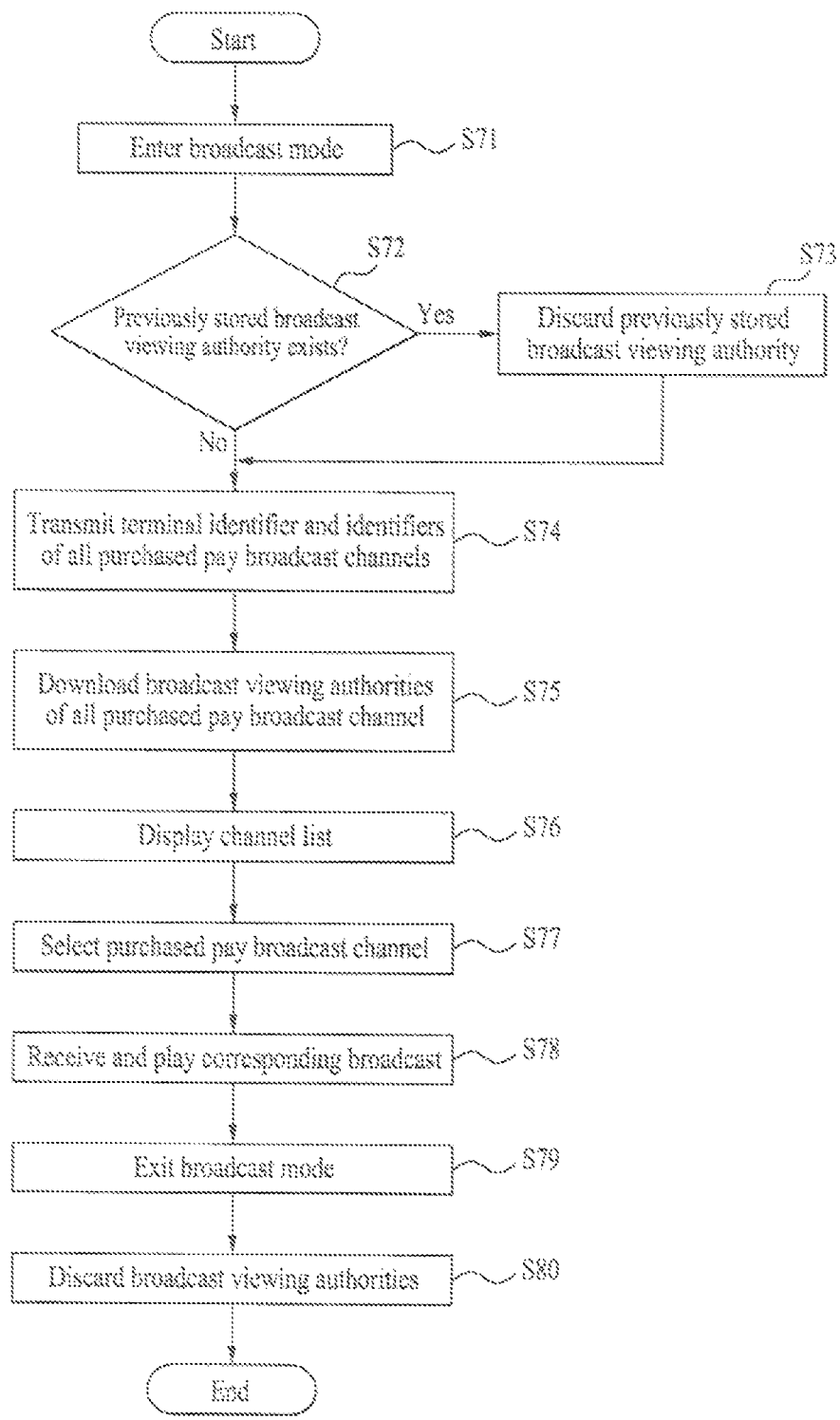
FIG. 7 is a flowchart for a method of controlling a mobile terminal according to an embodiment of the present invention.

FIG. 7 is a flowchart for a method of controlling a mobile terminal according to an embodiment of the present invention. And, FIG. 8 is a diagram of display screen configurations for implementing a method of controlling a mobile terminal according to an embodiment of the present invention.

Figure 8:
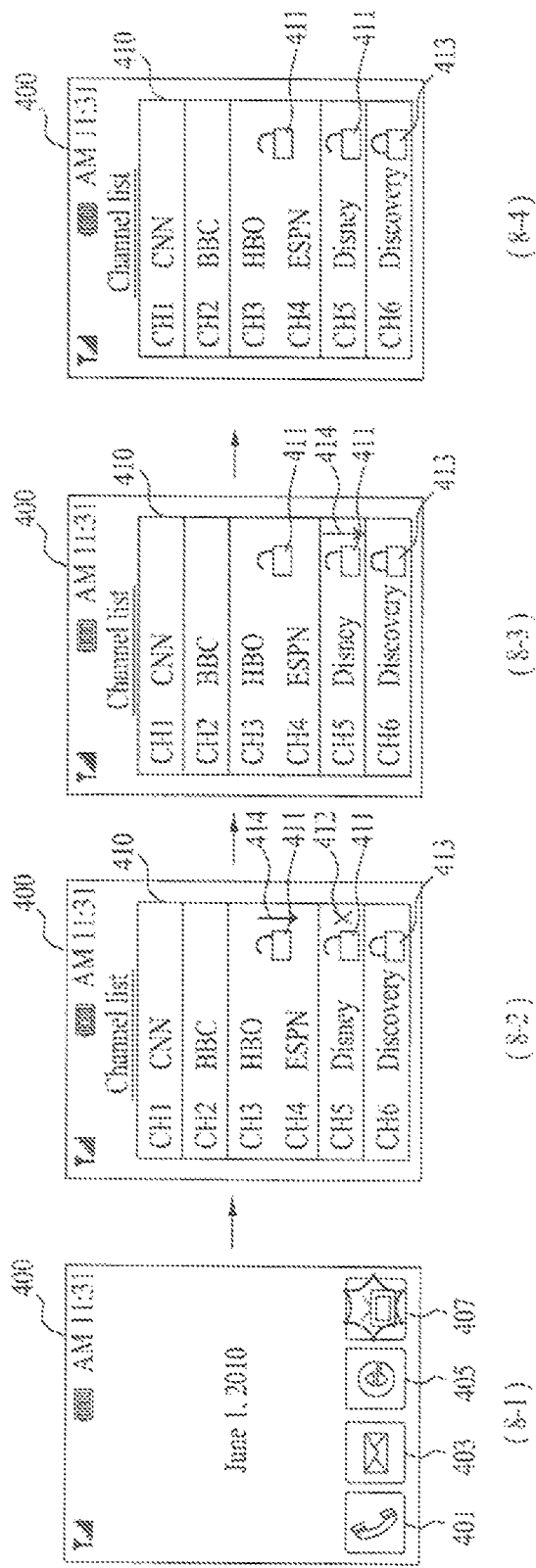
FIG. 8 is a diagram of display screen configurations for implementing a method of controlling a mobile terminal according to an embodiment of the present invention.

Referring to FIG. 8 (8-1), the mobile terminal 100 is in a standby mode. And, a standby screen can be displayed on the touchscreen 400. For instance, when a broadcast icon 407 is touched and selected from the standby screen, the mobile terminal 100 is able to enter the broadcast mode [S71].

When the mobile terminal 100 enters the broadcast mode, the controller 180 checks whether the previously stored broadcast viewing authority exists and is then able to discard the previously stored broadcast viewing authority [S72, S73].

The steps S72 and S73 can refer to the former steps S52 and S53 and details thereof shall be omitted from the following description for clarity.

Subsequently, the controller 180 transmits a terminal identifier of the mobile terminal 100 and channel identifiers of all pay broadcast channels purchased by the mobile terminal 100 to the broadcast viewing authority server 300 [S74]. If the broadcast viewing authority server 300 is provided with information on all the pay broadcast channels purchased by the mobile terminal 100, the controller 180 may not transmit the channel identifiers of all of the purchased pay broadcast channels to the broadcast viewing authority server 300.

The mobile terminal 100 then downloads valid broadcast viewing authorities of all of the purchased pay broadcast channels from the broadcast viewing authority server 300 [S75].

Subsequently, referring to FIG. 8 (8-2) to FIG. 8 (8-4), the controller 180 is able to display the channel list 410 [S76].

If the controller 180 displays the channel list 410 in the course of downloading the broadcast viewing authority, the download indicator 414, which indicates that the broadcast viewing authority is being downloaded, can be displayed for the corresponding pay broadcast channel.

In order to indicate that the broadcast viewing authority of the bundle including the pay broadcast channels HBO and ESPN among the pay broadcast channels in the channel list 410 is being downloaded, FIG. 8 (8-2) exemplarily shows that the download indicator 414 is displayed for the pay broadcast channel bundle.

As the download of the corresponding broadcast viewing authority is completed for the broadcast viewing authority of the pay broadcast channel bundle, FIG. 8 (8-3) exemplarily shows that neither the non-authority indicator 412 nor the download indicator 414 is displayed for the pay broadcast channel bundle. As the download indicator 414 is displayed for a different purchased pay broadcast channel 'Disney', it can be observed that a broadcast viewing authority for the different purchased pay broadcast channel is being downloaded.

As the non-authority indicator 412 or the download indicator 414 is not further displayed for all of the purchased pay broadcast channels of the channel list 410, FIG. 8 (8-4) exemplarily shows that all of the corresponding broadcast viewing authorities have been downloaded.

According to the above description, after the step S74 of transmitting the terminal identifier to the broadcast viewing authority server 300 and the step S75 of downloading the broadcast viewing authority have been initiated, the step S76 of displaying the channel list is executed, by which the present embodiment is non-limited. For instance, the step S76 of displaying the channel list can be performed simultaneously with one of the step S74 and the step S75. For another instance, the step S76 of displaying the channel list can be performed between the step S74 and the step S75. For another instance, the step S76 of displaying the channel list can be performed before the step S74.

Subsequently, when one of the pay broadcast channels is selected, the controller 180 is able to receive and play the corresponding broadcast using the corresponding broadcast viewing authority [S77, S78]. When the mobile terminal 100 exits the broadcast mode, the downloaded broadcast viewing authority can be discarded [S79, S80]. This is explained in the foregoing description and its details shall be omitted from the following description for clarity of this disclosure.

According to the above description, the mobile terminal 100 discards the previously stored old broadcast viewing authority, newly downloads the new broadcast viewing authority, and then receives and plays the broadcast of the corresponding pay broadcast channel using the newly downloaded new broadcast viewing authority, by which the present embodiment is non-limited. For instance, the broadcast of the corresponding pay broadcast channel can be received and played using both of the old broadcast viewing authority and the new broadcast viewing authority together. This is explained in detail with reference to FIG. 9 as follows.

FIG. 9 is a flowchart for a method of controlling a mobile terminal according to an embodiment of the present invention.

Referring to FIG. 9, as mentioned in the foregoing description, when the mobile terminal 100 is in a standby mode, a standby screen can be displayed on the touchscreen 400. If the broadcast icon 407 is touched and selected from the standby screen, the mobile terminal 100 is able to enter a broadcast mode [S91].

When the mobile terminal 100 enters the broadcast mode, unlike the former description, even if the previously stored old broadcast viewing authority exists, the controller 180 keeps the old broadcast viewing authority instead of discarding the old broadcast viewing authority [S92].

Once the mobile terminal 100 enters the broadcast mode, the controller 180 is able to display the channel list [S93].

Subsequently, one of the previously purchased pay broadcast channels can be selected from the displayed channel list [S94].

If so, the controller 180 receives the corresponding broadcast of the selected pay broadcast channel and then plays the received broadcast for a previously-set specific period of time, using the old broadcast viewing authority [S95].

The controller 180 accesses the broadcast viewing authority server 300 in the specific period of time and then downloads a new broadcast viewing authority corresponding to the pay broadcast channel [S96]. In order to download the new broadcast viewing authority, as mentioned in the foregoing description, the controller 180 may transmit the terminal identifier and the channel identifier to the broadcast viewing authority server 300.

Before the specific period of time expires or when the specific period of time ends, the controller 180 receives and plays the corresponding broadcast of the selected pay broadcast channel using the new broadcast viewing authority until the terminal user stops watching the broadcast of the selected pay broadcast channel [S97].

Afterwards, the controller 180 discards the old broadcast viewing authority [S98].

Accordingly, the present invention provides the following effects and/or advantages.

First of all, according to at least one of embodiments of the present invention, when the broadcast viewing authority is updated in the mobile terminal to prevent illegal copying or piracy of the broadcast viewing authority, the terminal user needs not to temporarily stop viewing the corresponding broadcast.

Secondly, according to at least one of embodiments of the present invention, each time the mobile terminal enters a broadcast mode, an old broadcast viewing authority is deactivated and a new broadcast viewing authority is received. Therefore, the illegal copying or piracy of the broadcast viewing authority stored in the mobile terminal can be basically prevented.

It will be apparent to those skilled in the art that various modifications and variations can be specified into other forms without departing from the spirit or scope of the inventions.

For instance, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
    a broadcast receiving unit for a broadcast reception;
    a wireless communication unit for an internet access;
    a broadcast security module configured to store a broadcast viewing authority;
    a display unit configured to play a broadcast; and
    a controller configured to:
    display a channel list in which channels including at least one pay broadcast channel receivable via the broadcast receiving unit are listed,
    receive the broadcast viewing authority from a broadcast viewing authority server via the broadcast receiving unit or the wireless communication unit, and
    control the broadcast viewing authority for viewing the pay broadcast channel stored in the broadcast security module to be updated each time a broadcast mode is entered,
    wherein the controller controls the broadcast viewing authority to be updated by deleting the stored broadcast viewing authority, receiving a new broadcast viewing authority from the broadcast viewing authority server and storing the received new broadcast viewing authority, and
    wherein the controller controls the stored broadcast viewing authority to be deleted each time the broadcast mode is entered or each time the entered broadcast mode is terminated.

2. The mobile terminal of claim 1, wherein the broadcast viewing authority comprises an EMM (entitlement management message).

3. The mobile terminal of claim 2, wherein the controller requests the new broadcast viewing authority to the broadcast viewing authority server by transmitting a channel identifier of the pay broadcast channel and a terminal identifier of the mobile terminal to the broadcast viewing authority server.

4. The mobile terminal of claim 2, wherein the controller controls the channel list to be displayed after the new broadcast viewing authority has been received.

5. The mobile terminal of claim 2, wherein the controller receives the new broadcast viewing authority after displaying the channel list and wherein the controller indicates a reception of the new broadcast viewing authority for the pay broadcast channel on the channel list.

6. The mobile terminal of claim 2, wherein after the channel list has been displayed, when the pay broadcast channel is selected for the broadcast reception, the controller controls the new broadcast viewing authority for the selected pay broadcast channel to be received.

7. The mobile terminal of claim 2, wherein the controller is further configured to:
    display the channel list including the pay broadcast channel,
    when the pay broadcast channel is selected from the channel list, receive and play the pay broadcast channel using the previously stored broadcast viewing authority for a specific period of time,
    receive and store a new broadcast viewing authority from the broadcast viewing authority server within the specific period of time,
    before the specific period of time expires or when the specific period of time expires, receive and play the pay broadcast channel using the newly stored broadcast viewing authority, and
    delete the previously broadcast viewing authority.

8. The mobile terminal of claim 2, wherein if the update is not successful, the controller controls the update to keep being tried as a background until the update becomes successful.

9. The mobile terminal of claim 2, wherein the controller decrypts an encrypted ECM (entitlement control message) received via the pay broadcast channel using the EMM and wherein the controller controls an expiry period of the EMM to be determined using the number of the decrypted ECMs used while a broadcast of the pay broadcast channel is played.

10. The mobile terminal of claim 2, wherein the broadcast security module is provided within a SIM card of the mobile terminal, integrally built in the broadcast receiving module, or configured as a separate individual module.

11. The mobile terminal of claim 1, wherein the broadcast viewing authority is applicable in common to a pay broadcast channel bundle including at least two pay broadcast channels.

12. A mobile terminal comprising:
    a broadcast receiving unit for a broadcast reception;
    a wireless communication unit for an internet access;
    a broadcast security module configured to store a broadcast viewing authority;
    a display unit configured to play a broadcast; and
    a controller configured to:
    display a channel list in which channels including at least one pay broadcast channel receivable via the broadcast receiving unit are listed,
    receive the broadcast viewing authority from a broadcast viewing authority server via the broadcast receiving unit or the wireless communication unit, and
    control the broadcast viewing authority for viewing the pay broadcast channel stored in the broadcast security module to be updated each time a broadcast mode is entered,
    wherein after the channel list has been displayed, when the pay broadcast channel is selected for the broadcast reception, the controller controls the new broadcast viewing authority for the selected pay broadcast channel to be received, and
    wherein after the new broadcast viewing authority has been received, while a broadcast of the selected pay broadcast channel is received and displayed, the controller controls a new broadcast viewing authority for a different pay broadcast channel in the channel list to be received as a background.

13. A mobile terminal comprising:
    a broadcast receiving unit for a broadcast reception;
    a wireless communication unit for an internet access;
    a broadcast security module configured to store a broadcast viewing authority;
    a display unit configured to play a broadcast; and a controller configured to:

display a channel list in which channels including at least one pay broadcast channel receivable via the broadcast receiving unit are listed, receive the broadcast viewing authority from a broadcast viewing authority server via the broadcast receiving unit or the wireless communication unit, and control the broadcast viewing authority for viewing the pay broadcast channel stored in the broadcast security module to be updated each time a broadcast mode is entered, wherein if the update of the broadcast viewing authority is not successful, the controller controls the update of the broadcast viewing authority to be resumed when an update resume command is inputted by a terminal user or a broadcast service guide is updated via the wireless communication unit or the broadcast receiving unit.

14. A method of controlling a mobile terminal, comprising:

displaying a channel list in which receivable channels including at least one pay broadcast channel are listed;

receiving a broadcast viewing authority for watching the pay broadcast channel from a broadcast viewing authority server via a broadcasting network or an interne network;

storing the received broadcast viewing authority; and updating the stored broadcast viewing authority each time a broadcast mode is entered, wherein the updating of the stored broadcast viewing authority comprises deleting the stored broadcast viewing authority, receiving a new broadcast viewing authority from the broadcast viewing authority server and storing the received new broadcast viewing authority, and wherein the stored broadcast viewing authority is deleted each time the broadcast mode is entered or each time the entered broadcast mode is terminated.

* * * * *